Patented July 21, 1931

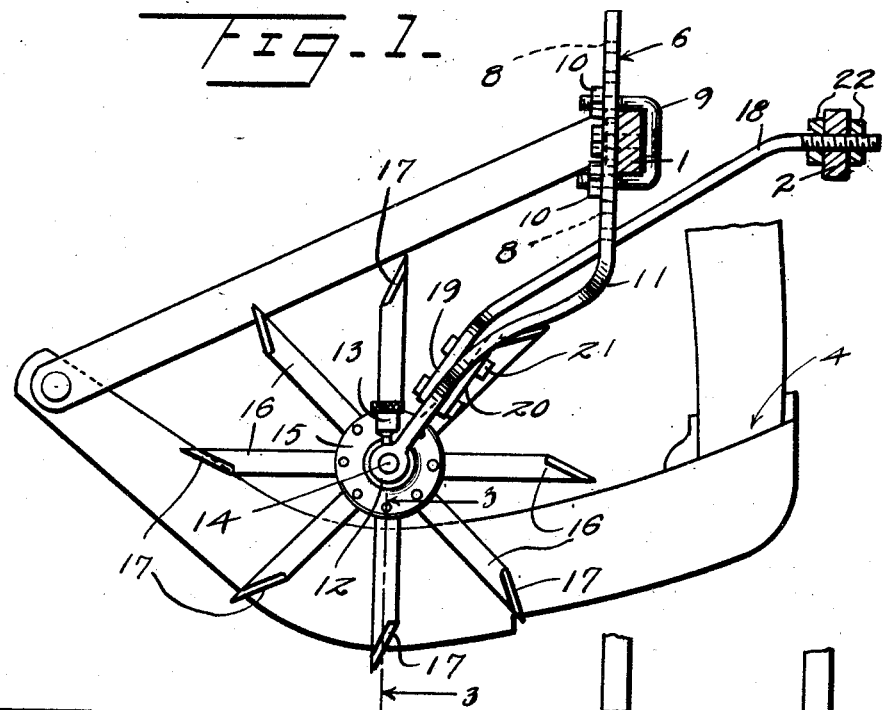
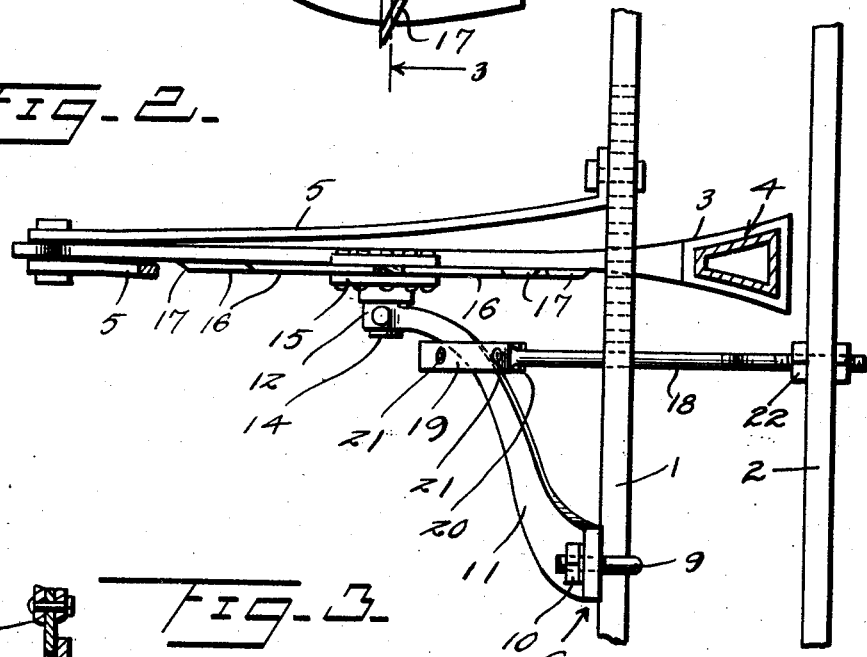
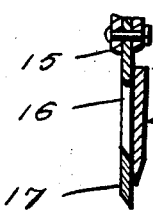

1,815,497

UNITED STATES PATENT OFFICE

EDWIN H. COLSON, OF OAKLAND, NEBRASKA

RUNNER CLEANER FOR PLANTERS

Application filed August 10, 1929. Serial No. 384,898.

This invention relates to attachments for planters and pertains particularly to a cleaning device therefor designed to be used in association with a runner.

The primary object of the present invention is to provide a device which will operate along side of a planter runner to cut away weeds and brush so that a clean-cut furrow will be formed in the earth which can be smoothly covered up by the usual wheel which follows the planter runner.

A further object of the invention is to provide in addition to the foregoing a device for cutting away roots and weeds from the planter runner so that the draft of the machine will be lighter and thus effect a saving in fuel and time in connection with the operation thereof.

The invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention, as expressed in the appended claims.

In the drawings:—

Figure 1 is a view in side elevation of a planter runner showing the cleaner embodying the present invention applied thereto.

Figure 2 is a view in top plane of the runner and cleaner therefor.

Figure 3 is a sectional view taken substantially upon the line 3—3 of Figure 1.

Referring more particularly to the drawings wherein like numerals of reference indicate corresponding parts throughout the several views, the numerals 1 and 2 indicate front and rear cross frames respectively of a planter machine which frames support the planter runners, the drill and seed hopper and various other elements of the machine. In order to show the application of the present invention, one runner is shown attached to the front frame 1 and is indicated generally by the numeral 3.

As is of course well known, these runners have leading downwardly through the rear portion thereof the seed chute 4 which conducts seeds from a hopper arranged thereabove (not shown) to the furrow made by the front portion of the runner, and the forward upturned end of the runner is held in position by a pair of brace arms 5 which are adjustably secured at their rear ends to the front cross frame of the machine, in the manner shown.

The present cleaner device consists of a bracket indicated generally by the numeral 6 which may be formed of strap iron of suitable weight. This bracket comprises a relatively long upright portion 7 provided with a longitudinally extending series of apertures 8. This portion of the bracket is placed in position across and at right angles to the face of the front cross frame 2, in the manner shown, and suitable means is employed for securing it to the frame, such for example as a U-bolt 9, the ends of the legs of which are extended through the apertures 8 to receive holding nuts 10.

The lower portion of the part 7 of the bracket is curved laterally and is directed downwardly and forwardly as indicated at 11 and terminates in a bearing 12 which carries a grease cup 13. The bearing 12 receives a stub shaft 14 to which is attached, either by a suitable key or by welding or the like, a disc 15 to the outer face of which is secured a laterally extending series of cutter blades 16. The outer end of each of the cutter blades is cut obliquely and is sharpened to form a cutting edge 17, the flat face of which passes over and in close proximity to the adjacent runner, in the manner shown. The adjustment of the bracket for proper working of the device is such that the sharpened edges 17 of the blades as they rotate through contact of the points with the ground, sweep along the curved lower edge of the runner so that any grass or weeds which may have collected in front of the runner will be cleanly cut away to permit the runner to cut sharply into the ground and make a clean furrow for the reception of seed.

In order to brace the lower part of the supporting bracket 6 so that it will be held firmly in position adjacent the runner there is provided a brace rod 18 which is flattened at its forward end, as indicated at 19, and which has this flattened forward end secured to the bracket adjacent the bearing 12 by an underplate 20 and bolts 21 which connect the underplate with the flattened portion 19, in the manner shown. The rear end of the brace rod 18 is passed through a suitable one of the numerous apertures formed through the rear cross frame and held in the proper adjusted position by means of the two bolts 22 which are threaded upon the rod and positioned upon opposite sides of the frame.

From the foregoing description it will be readily apparent that by using the cutter attachment herein described in association with each of the runners of a planter, cleaner furrows will be formed and the cover-up wheel following will thus be better able to perform its furrow closing operation and in addition to this the operation of the machine will be made easier because of the removal from in front of the runners of the weeds and roots which usually gather and which impede the progress of the vehicle.

Having thus described my invention, what I claim is:—

1. The combination with the runner of a seed planter, of a bracket member, means for vertically and horizontally adjustably attaching the bracket to a portion of the planter adjacent the runner, a stub shaft supported by said bracket, a series of knives carried by said shaft and arranged radially thereof and adapted to pass along the ground engaging edge of the runner to cut away trash, and a brace member engaging said bracket adjacent the shaft and adapted to be rigidly secured to the planter.

2. The combination with a runner of a seed planter, of a bracket adapted to be adjustably secured to the planter adjacent the runner, a bearing carried by the bracket, said bracket being formed to arrange the bearing in offset relation thereto, a stub shaft carried by the bearing, and a plurality of knives carried by and extending radially of the stub shaft and each having its outer end cut obliquely and sharpened to form a cutting edge, said cutting edges of the knives being adapted to pass along the ground engaging edge of the runner to cut undesirable material from engagement therewith.

3. The combination with the runner of a seed planter having a rounded advancing ground engaging edge, of a bracket member adapted to be secured to the planter adjacent the runner, a shaft carried by the bracket and directed transversely of the runner, a hub mounted on the shaft, and a series of knives extending radially from said hub and each comprising an elongated flat body cut obliquely at its outer end, one side of the oblique portion being beveled to form a cutting edge, the other side of the body moving across one face of the runner in close proximity thereto and in a plane parallel with the face, the cutting edges of the knives extending across and following the major portion of the curvature of the rounded edge of the runner, during their rotation.

In testimony whereof I hereunto affix my signature.

EDWIN H. COLSON.